US008417412B2

(12) United States Patent
Tominaga et al.

(10) Patent No.: US 8,417,412 B2

(45) Date of Patent: Apr. 9, 2013

(54) ABNORMALITY DETECTION DEVICE, ABNORMALITY INFORMATION TRANSMISSION METHOD, AND ABNORMALITY INFORMATION TRANSMISSION SYSTEM

(75) Inventors: Hiroshi Tominaga, Toyota (JP); Keizoh Kawaguchi, Okazaki (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 0 days.

(21) Appl. No.: 12/866,361

(22) PCT Filed: Mar. 19, 2009

(86) PCT No.: PCT/JP2009/056217

§ 371 (c)(1), (2), (4) Date: Aug. 5, 2010

(87) PCT Pub. No.: WO2009/119783

PCT Pub. Date: Oct. 1, 2009

(65) Prior Publication Data

US 2010/0324777 A1 Dec. 23, 2010

(30) Foreign Application Priority Data

Mar. 25, 2008 (JP) ................................ 2008-077293

(51) Int. Cl.
*G01M 17/00* (2006.01)

(52) U.S. Cl. ..................... 701/32.7; 701/33.1; 701/34.4; 701/33.4; 701/32.5; 701/31.4

(58) Field of Classification Search ..................... 701/33
See application file for complete search history.

(56) References Cited

U.S. PATENT DOCUMENTS

| | | | | |
|---|---|---|---|---|
| 6,067,009 | A | 5/2000 | Hozuka et al. | |
| 6,256,594 | B1 | 7/2001 | Yamamoto et al. | |
| 2005/0015380 | A1* | 1/2005 | Burkhardt et al. | 707/100 |
| 2005/0021200 | A1* | 1/2005 | Taki | 701/33 |
| 2007/0126559 | A1 | 6/2007 | Adachi | |

FOREIGN PATENT DOCUMENTS

| | | |
|---|---|---|
| JP | 06-229884 | 8/1994 |
| JP | 10-089162 | 4/1998 |
| JP | 2002-235599 A | 8/2002 |
| JP | 2003-272098 A | 9/2003 |
| JP | 2005-041438 A | 2/2005 |
| JP | 2006-096325 A | 4/2006 |
| JP | 2007-156949 A | 6/2007 |

OTHER PUBLICATIONS

Japanese Office Action issued in corresponding Patent Application 2008-077293, dated Oct. 4, 2011.
International Search Report PCT/JP2009/056217, Jun. 23, 2009.

* cited by examiner

*Primary Examiner* — Marissa Thein
*Assistant Examiner* — Milena Racic
(74) *Attorney, Agent, or Firm* — Sughrue Mion, PLLC

(57) ABSTRACT

An abnormality detection device is disclosed that includes a storage unit configured to, when abnormality of an in-vehicle device is detected, store abnormality information of the abnormality; a transmission unit configured to transmit the abnormality information to a server; an in-vehicle information terminal configured to, when driving support information is provided to an occupant and read-out operation information is input through an operation section, read out the abnormality information stored in the storage unit; and a transmission prevention unit configured to, when the read-out operation information is input through the operation section, prevent transmission of the abnormality information to the server.

8 Claims, 9 Drawing Sheets

ABNORMALITY DETECTION DEVICE, ABNORMALITY INFORMATION TRANSMISSION METHOD, AND ABNORMALITY INFORMATION TRANSMISSION SYSTEM

TECHNICAL FIELD

The present invention relates to an abnormality detection device, an abnormality information transmission method, and an abnormality information transmission system capable of transmitting abnormality information from a vehicle to an analysis center, the abnormality information being related to an in-vehicle device of the vehicle.

BACKGROUND ART

Generally, various parts and systems are integrated in a vehicle and controlled by electronic control units that are configured to drive an actuator and the like based on, for example, signals detected by sensors and a processing result by a computer. Further, such electronic control units generally include a self-diagnosis function to diagnose whether in-vehicle devices such as sensors and actuators are being operated correctly. There is a known technique (for example in Patent Document 1) in which, when a result of the self-diagnosis shows that abnormality is detected, abnormality information such as a diagnosis code and freeze frame data are stored in the electronic control units so that the stored abnormality information are read out later by using a diagnosis tool in a service facility or the like to be used for analyzing a cause of the abnormality and the like. Further, in order to collect the abnormality information more effectively, when the abnormality information is detected, the detected abnormality information are transmitted to an analysis center and stored in a database in the analysis center so that the analysis center analyzes the abnormality of the vehicle.

However, if all the abnormality information is transmitted to the analysis center, namely, for example, abnormality information generated due to a simulated signal for simulating an abnormality in a service facility or abnormality information that is generated while parts are exchanged and that is not related to any abnormality are transmitted to the analysis center, the analysis center may not determine whether the transmitted abnormality information is based on an actual failure or a false alarm due to the simulated signal, the parts exchange, and the like, thereby making it difficult to analyze the causes of the abnormality.

To overcome the problem, a communication method is proposed (for example, in Patent Document 2) in which when the abnormality information is output to a diagnosis tool from a vehicle, the abnormality information is not transmitted to the analysis center. Namely, when the abnormality information is output to the diagnosis tool, it is regarded that the vehicle is in a service facility or the like to receive service, inspection, or repair. Therefore, it may become possible to prevent the transmission of the abnormality information related to the simulated signal and the parts exchange to the analysis center.

Patent Document 1: Japanese Patent Application Publication No. 2006-96325

Patent Document 2: Japanese Patent Application Publication No. 2005-41438

DISCLOSURE OF INVENTION

Problem to be Solved by the Invention

However, in the communication method described in Patent Document 2, it is not possible to prevent the transmission of the abnormality information while no diagnosis tool is connected. In a service facility, various services such as parts exchange may be carried out without connecting the diagnosis tool. In this case, there may arise a problem that the abnormality information is undesirably transmitted to the analysis center.

Certainly, it may be possible to manually set an in-vehicle device so that the transmission of the abnormality information is prevented when a vehicle is in for repair in a service facility or the like. However, a service person in the service facility or the like may forget to manually set the in-vehicle device. Further, the setting may be cancelled by a timer (to be able to resume the transmission of the abnormality information) so as to make sure that the setting is certainly cancelled. Therefore, after a predetermined time, the abnormality information may be transmitted.

The present invention is made in light of the problem and may provide an abnormality detection device, an abnormality information transmission method, and an abnormality information transmission system capable of appropriately handling the abnormality information even when abnormality of an in-vehicle device of a vehicle is detected while the vehicle is in for service.

Means for Solving Problem

According to an aspect of the present invention, an abnormality detection device includes a storage unit configured to, when abnormality of an in-vehicle device is detected, store abnormality information of the abnormality; a transmission unit configured to transmit the abnormality information to a server; an in-vehicle information terminal configured to, when driving support information is provided to an occupant and read-out operation information is input through an operation section, read out the abnormality information stored in the storage unit, and a transmission prevention unit configured to, when the read-out operation information is input through the operation section, prevent transmission of the abnormality information to the server.

According to an embodiment of the present invention, an operation is detected that is most likely to be performed in a service facility and the like when a vehicle is in for service, and based on the detected operation, the transmission of the abnormality information is prevented. Therefore, it may become possible to automatically prevent the transmission of the abnormality information without requiring an alarm prevention operation performed by a service person.

Effect of the Invention

According to an embodiment of the present invention, it may become possible to provide an abnormality detection device, an abnormality information transmission method, and an abnormality information transmission system capable of appropriately handling the abnormality information even when abnormality of an in-vehicle device of a vehicle is detected while the vehicle is in for service.

EXPLANATION OF LETTERS AND NUMERALS

11,11A-11C: ECU
12: IN-VEHICLE INFORMATION TERMINAL
13: DIAGNOSIS MASTER ECU
23: ABNORMALITY INFORMATION TRANSMISSION PREVENTION SECTION
24: PREVENTION CANCEL SECTION
25: SERVICE DETECTION SECTION
26: SERVICE CANCEL DETERMINATION SECTION
33: ABNORMALITY INFORMATION DETERMINATION SECTION
40: SERVICE FACILITY
50: VEHICLE
60: ANALYSIS CENTER
70: SERVER
100: ABNORMALITY DETECTION DEVICE
200: ABNORMALITY INFORMATION TRANSMISSION SYSTEM

BEST MODE FOR CARRYING OUT THE INVENTION

In the following, a best mode for carrying out an embodiment of the present invention is described with reference to the accompanying drawings.

Embodiment 1

[Outline of Abnormality Detection Device 100]

Figure 1:
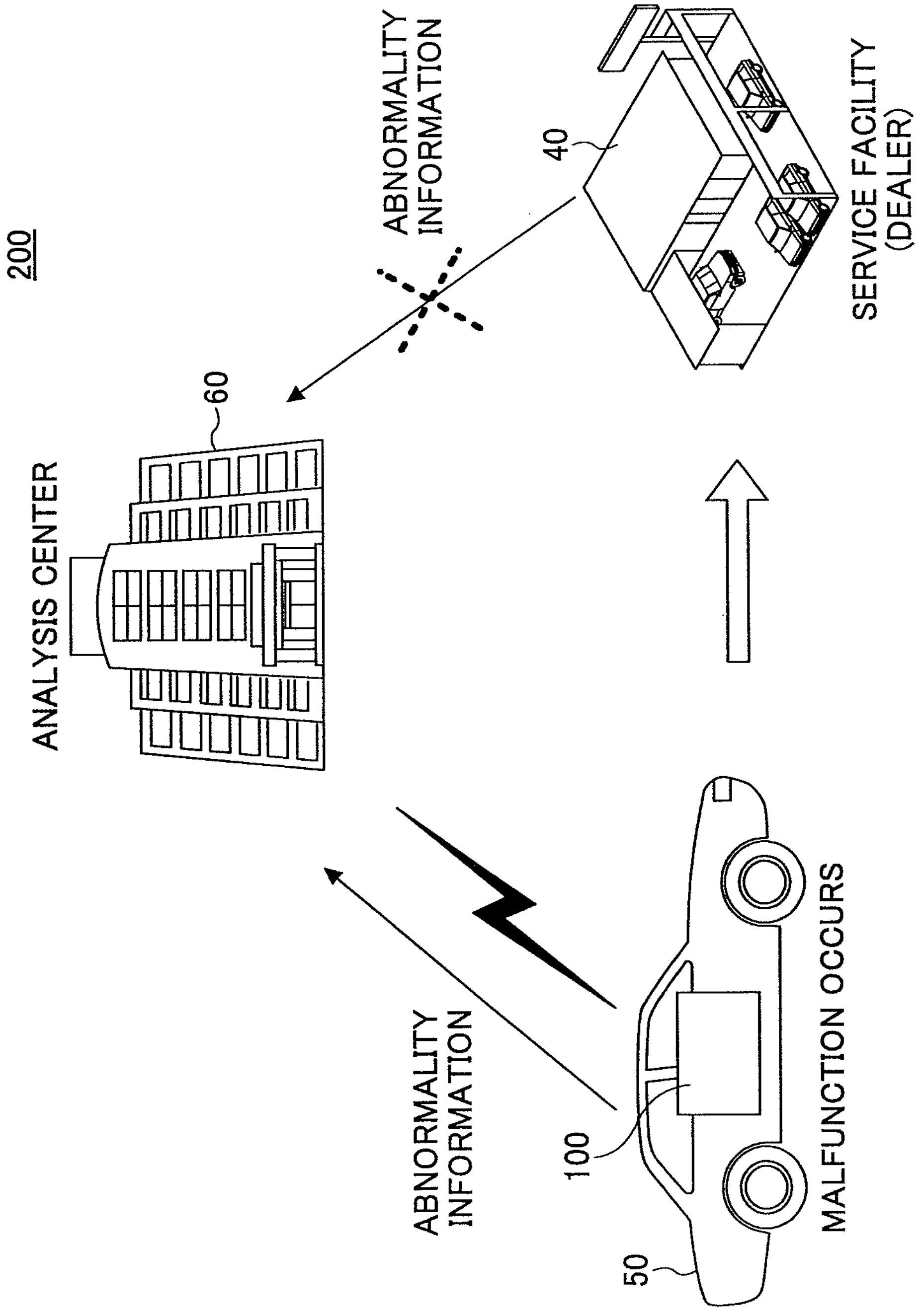
FIG. 1 is a drawing schematically showing an exemplary configuration of an abnormality information transmission system.
Figure 2:
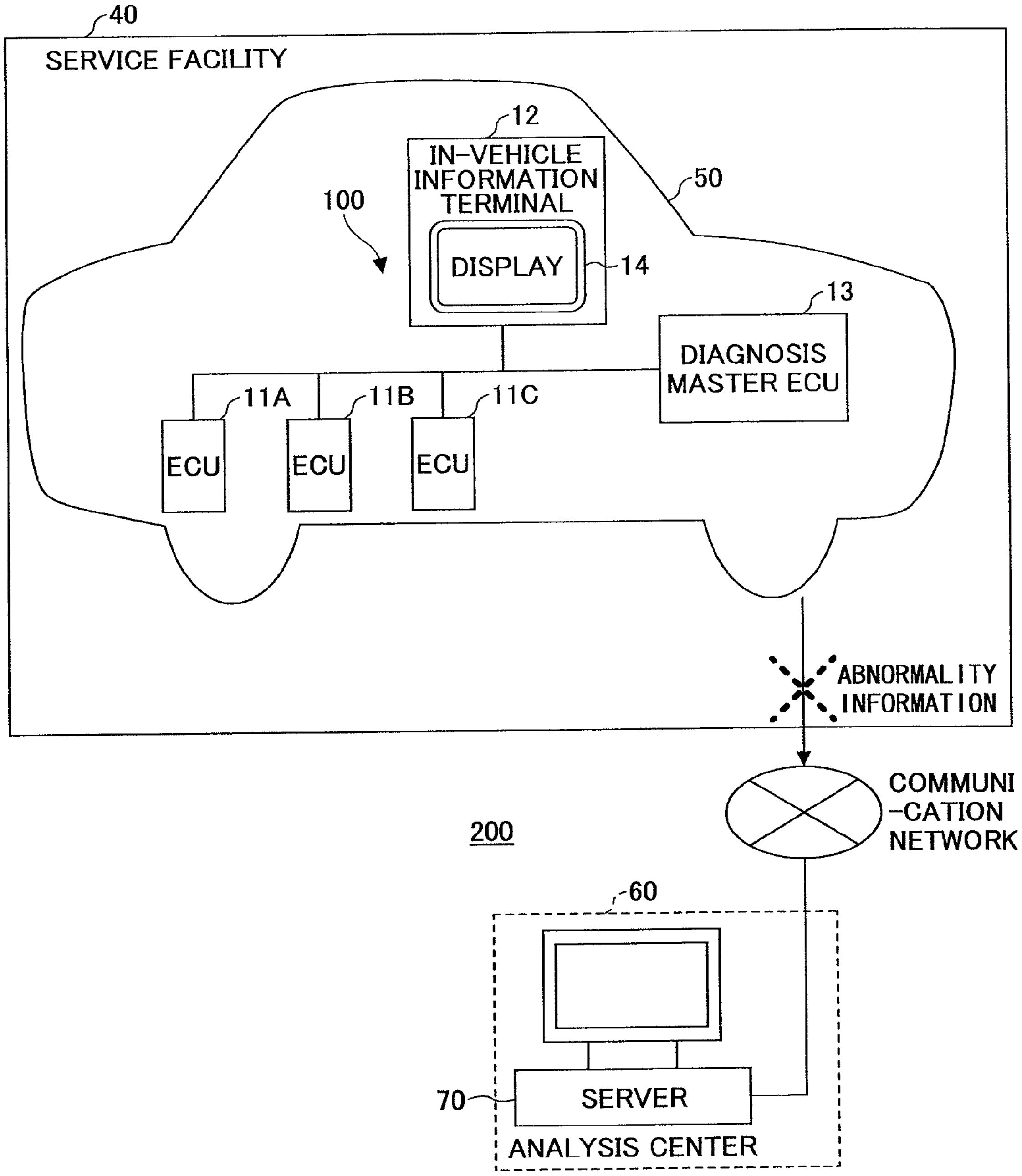
FIG. 2 is a drawing schematically showing an exemplary configuration of an abnormality detection device.

FIGS. 1 and 2 are drawings schematically showing configurations of an abnormality information transmission system 200 and an abnormality detection device 100, respectively. In the following, a status where an expected function cannot be performed (and prescribed repair is required to be done) is referred to as "malfunction"; any trouble detected regardless of whether there is an actual malfunction is referred to as "abnormality"; and any works (such as service and inspection) other than repair performed when a vehicle is not actually malfunctioning is referred to as simply "service".

When a sensor or an actuator of a vehicle 50 malfunctions, an abnormality detection device 100 in the vehicle 50 causes a meter panel or the like to turn ON an alarm lamp. When the malfunction is not serious, the alarm lamp may not be caused to be turned ON. The abnormality detection device 100 stores abnormality information including a diagnosis code and freeze frame data (hereinafter referred to as "FFD") and transmits the abnormality information to an analysis center 60 at predetermined periodical timings or when the abnormality is detected. When an occupant (such as the driver) of the vehicle 50 notices that the alarm lamp is turned ON, the occupant brings the vehicle 50 into a service facility 40.

The service facility 40 may be, for example, a dealer who can provide service work to the vehicle 50. However, it is not always necessary that the service facility 40 is a dealer. Namely, as long as the service work can be provided, the service facility 40 may include an affiliated facility affiliated with the dealer or an independent (unaffiliated) service facility 40.

As shown in FIG. 2, the vehicle 50 includes electronic control units (ECUs) 11A through 11C (hereinafter may be collectively referred to as an ECU 11) controlling sensors and actuators, a diagnosis master ECU 13 collecting the abnormality information and transmitting the collected abnormality information to a server 70 in the analysis center 60, an in-vehicle information terminal 12 displaying a road map, traffic information, a received broadcast, and the like, and an in-vehicle LAN such as a controller area network (CAN) and a local interconnect network (LIN) interconnecting the ECU 11, the diagnosis master ECU 13, and the in-vehicle information terminal 12.

On the other hand, in the in-vehicle information terminal 12, it is possible to set an abnormality checking mode in which the ECU 11 reads out abnormality information to be stored and the read out abnormality information is displayed on a display 14 such as an LCD or organic EL. To avoid accidental operation to activate the abnormality checking mode by an occupant of the vehicle 50, the abnormality checking mode is configured to be activated only by a particular operation. Therefore, when the abnormality checking mode is activated, it is possible to assume that the vehicle 50 is "in for service" in a service facility.

Next, an abnormality detection device 100 according to this embodiment of the present invention is described. In the abnormality detection device 100, when the abnormality checking mode is activated via the in-vehicle information terminal 12, it is assumed that the vehicle 50 is in for service and the transmission of the abnormality information from the diagnosis master ECU 13 to the server is prevented.

Generally, regardless of whether the configuration according to this embodiment of the present invention is employed, a service person may perform an operation to prevent the transmission of the abnormality information (hereinafter referred to as "alarm prevention"). However, when the vehicle 50 is equipped with the in-vehicle information terminal 12 and the service person is required to check the abnormality, the service person always activate the abnormality checking mode via the in-vehicle information terminal 12. Therefore, by setting the prevention of the transmission of the abnormality information as a result of the abnormality checking mode being activated, it may become possible to prevent the transmission of the abnormality information generated due to service work without a separate alarm prevention operation performed by the service person.

[Abnormality Detection Device 100]

Figure 3:
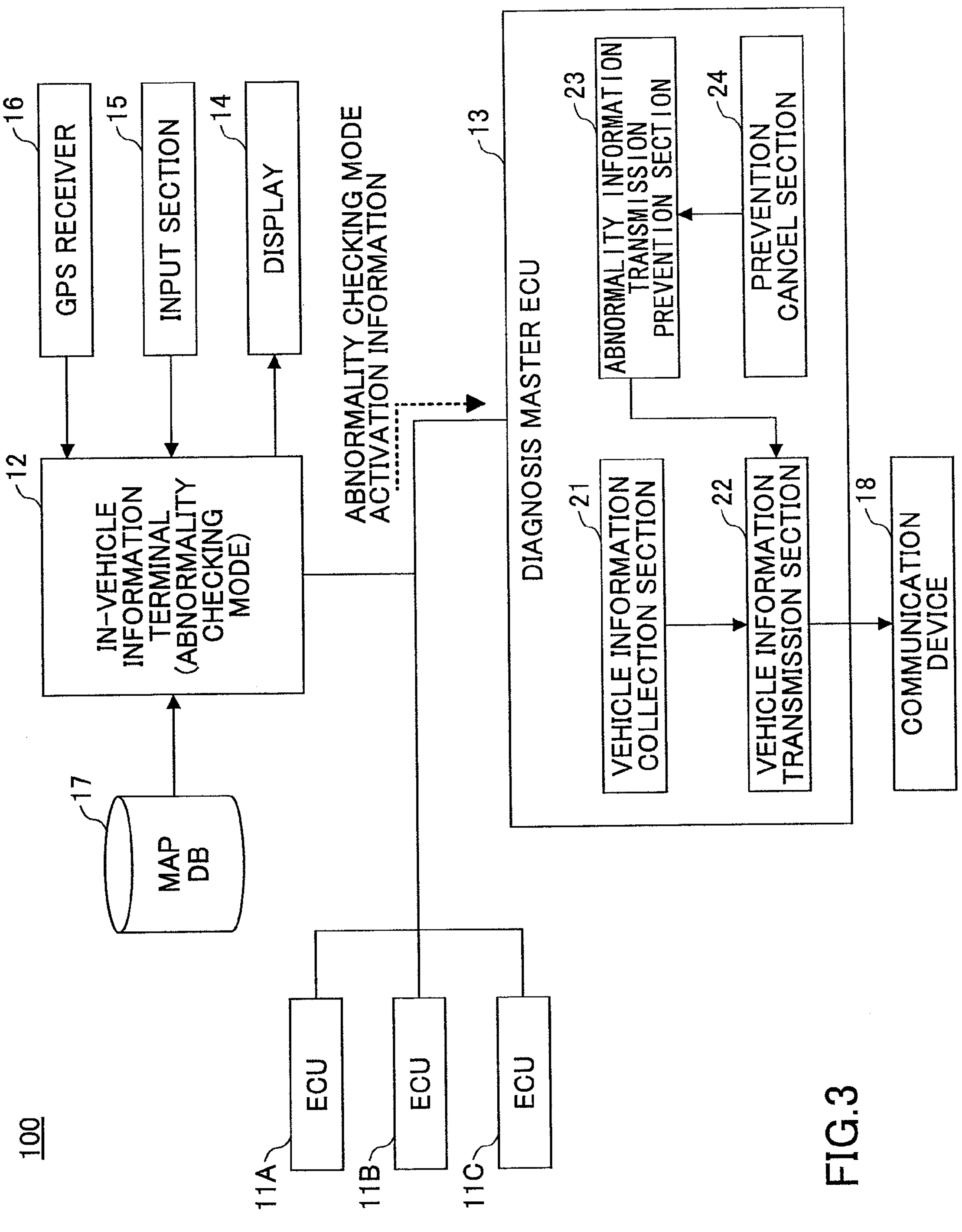
FIG. 3 is an example of a functional block diagram of the abnormality detection device.

FIG. 3 shows an example of a functional block diagram of the abnormality detection device 100. In FIG. 3, the same reference numerals are commonly used for the same elements in FIG. 2 and the description thereof is omitted. In the abnormality detection device 100, the diagnosis master ECU 13 serves as a controller to control other elements of the abnormality detection device 100. The in-vehicle information terminal 12 includes the display 14 on which, for example, a road map of the current position of the vehicle 50 is displayed.

The in-vehicle information terminal 12 may further include a navigation system that provides guidance to a destination. In FIG. 3, the in-vehicle information terminal 12 is separated from the diagnosis master ECU 13. However, preferably, the functions of the diagnosis master ECU 13 is integrated into the in-vehicle information terminal 12. By doing this, it may become possible to improve the efficiency of the in-vehicle information terminal 12 having powerful processing capabilities and save a mounting space and reduce weight of the diagnosis master ECU 13.

As shown in FIG. 3, the in-vehicle information terminal 12 is connected to a map DB (Data Base) 17, a GPS (Global Positioning System) receiver 16, an input section 15, and the above-described display 14. In the map DB 17, a road network is split into nodes and links, and the position information of the nodes and the connection information of the links between nodes are stored. Therefore, by tracing the nodes and links, the road network can be formed. Further, the position information of the service facility 40 as well as position information of, such as, gas stations and public facilities may be stored in the map DB 17.

The GPS receiver 16 detects the position of the vehicle 50 based on arrival time of electric waves transmitted from GPS satellites. The in-vehicle information terminal 12 accurately estimates the position of the running vehicle 50 by taking the position detected by the GPS receiver 16 as the starting point and accumulating a running distance detected by a wheel velocity sensor in a running direction detected by a gyro sensor.

The input section 15 is a user interface through which an occupant or a service person inputs operational information into the in-vehicle information terminal 12. More specifically, for example, the input section 15 may be a push-button type keyboard, a voice recognition device to input voice of the occupant, a touch panel formed on the display 14, and the like. The display 14 is used for displaying the above-described road map, a TV image, and the like. Further, in the abnormality checking mode, the abnormality information is displayed on the display 14.

The abnormality checking mode is activated via the in-vehicle information terminal 12 when operational information is input through the input section 15, the operational information being an operation such that a predetermined key is continuously pressed, a plurality of keys are simultaneously pressed, or the like. When the abnormality checking mode is activated, the in-vehicle information terminal 12 sends a request to the ECU 11 to transmit the abnormality information stored in the ECU 11. Further, when the abnormality checking mode is activated, the in-vehicle information terminal 12 transmits abnormality checking mode activation information to the diagnosis master ECU 13. In the CAN, the in-vehicle information terminal 12 and the ECU 11 communicate with each other by a time division multiplexed communication scheme using a common signal line.

The ECU 11 storing abnormality information transmits the abnormality information to the in-vehicle information terminal 12 or the diagnosis master ECU 13. The abnormality information transmitted to the in-vehicle information terminal 12 is further transmitted to the diagnosis master ECU 13. The diagnosis master ECU 13 stores the transmitted abnormality information and transmits the stored abnormality information to the analysis center 60 at a predetermined timing.

The ECU 11 may include an engine ECU, a hybrid ECU, a brake ECU, and the like. The number of the ECU 11 is not limited to three. For example, two or less or four or more ECUs may be connected. The abnormality information may include FFD of a predetermined time period before and after abnormality is detected and a diagnosis code (such as A000001) indicating the content of the abnormality, the FFD and the diagnosis code being stored in the ECU 11. The items of the FFD are previously determined depending on the sensors and actuators connected to the ECU 11. For example, in a case of the engine ECU, the items of the FFD may be an engine rotation speed, an intake air amount, an intake air temperature, and the like. On the other hand, in a case of the brake ECU, the items of the FFD may be a wheel speed, a reduction speed, a master cylinder pressure, and the like. The diagnosis code is made from a combination of a symbol or a number or both and indicates the content of the abnormality. Based on a code list in which the diagnosis codes are associated with the corresponding content of abnormality, the service person can determine the content of the abnormality.

The diagnosis master ECU 13 is configure of a computer in which a CPU, a RAM, a ROM, a communication interface, and a nonvolatile memory are connected to each other through an internal bus. As shown in FIG. 3, the diagnosis master ECU 13 according to this embodiment of the present invention includes a vehicle information collection section 21, a vehicle information transmission section 22, an abnormality information transmission prevention section 23, and a prevention cancel section 24, which are implemented by executing a program stored in the ROM or the nonvolatile memory by the CPU, or by hardware such as an ASIC (Application Specific Integrated Circuit). Further, the diagnosis master ECU 13 is connected to a communication device 18.

The vehicle information collection section 21 collects the abnormality information transmitted from the ECU 11 and other vehicle information. The abnormality information is collected when the abnormality is detected. On the other hand, the vehicle information is collected even no abnormality is detected. However, both the abnormality information and the vehicle information may at least partially include the same information. While the vehicle 50 is running, the vehicle information is sequentially overwritten from the oldest part of the vehicle information, and the vehicle information when abnormality is detected is prevented from being overwritten so as to be compared with the FFD to be used when the malfunction of the vehicle 50 is analyzed. Further, the vehicle information is transmitted to the analysis center 60 regularly or irregularly. In the description of this embodiment of the present invention, the transmission of the abnormality information is described.

When abnormality is detected, the vehicle information transmission section 22 transmits the abnormality information to the analysis center 60. On the other hand, while no abnormality is detected, the vehicle information transmission section 22 transmits the vehicle information to the analysis center 60 regularly or irregularly.

However, when the abnormality checking mode activation information is received from the in-vehicle information terminal 12, the abnormality information transmission prevention section 23 prevents the transmission of the abnormality information. By doing this, once service work to the vehicle 50 is started in the service facility 40, even when abnormality is detected due to parts exchange or a simulated signal during the service work, it may become possible to prevent the transmission of the abnormality information to the analysis center 60.

Further, the prevention cancel section 24 cancels the prevention of the transmission of the abnormality information conducted by the abnormality information transmission prevention section 23. More specifically, the prevention cancel section 24 stores a prevention-time running distance which is a running distance when the abnormality information transmission prevention section 23 prevents the transmission of the abnormality information. Then, when the vehicle 50 runs farther than a predetermined distance from the prevention-time running distance as a reference, the prevention cancel section 24 cancels the prevention of the transmission of the abnormality information. In this case, whether the vehicle 50 runs farther than a predetermined distance may be determined by comparing a running distance indicated by an odometer with the prevention-time running distance. Before the running distance reaches the predetermined distance (for example, 10 km) from the prevention-time running distance, the transmission of the abnormality information is prevented. Therefore, for example, after service or repair activities, when it is necessary to check parts in a test run and if abnormality is detected from the parts in the test run, the transmission of the abnormality information generated due to the parts can be advantageously prevented.

In the communication device 18, a protocol process and an error correction process are performed with respect to the abnormality information (digital data). Then, the generated (processed) baseband signal is π/4QPSK modulated onto a carrier wave, and the modulated signal is amplified and transmitted from an antenna. The carrier wave is transmitted to the analysis center 60 through a base station of a cellular phone network or an access point of a wireless LAN.

[Operational Process of Abnormality Detection Device 100]

Figure 4:
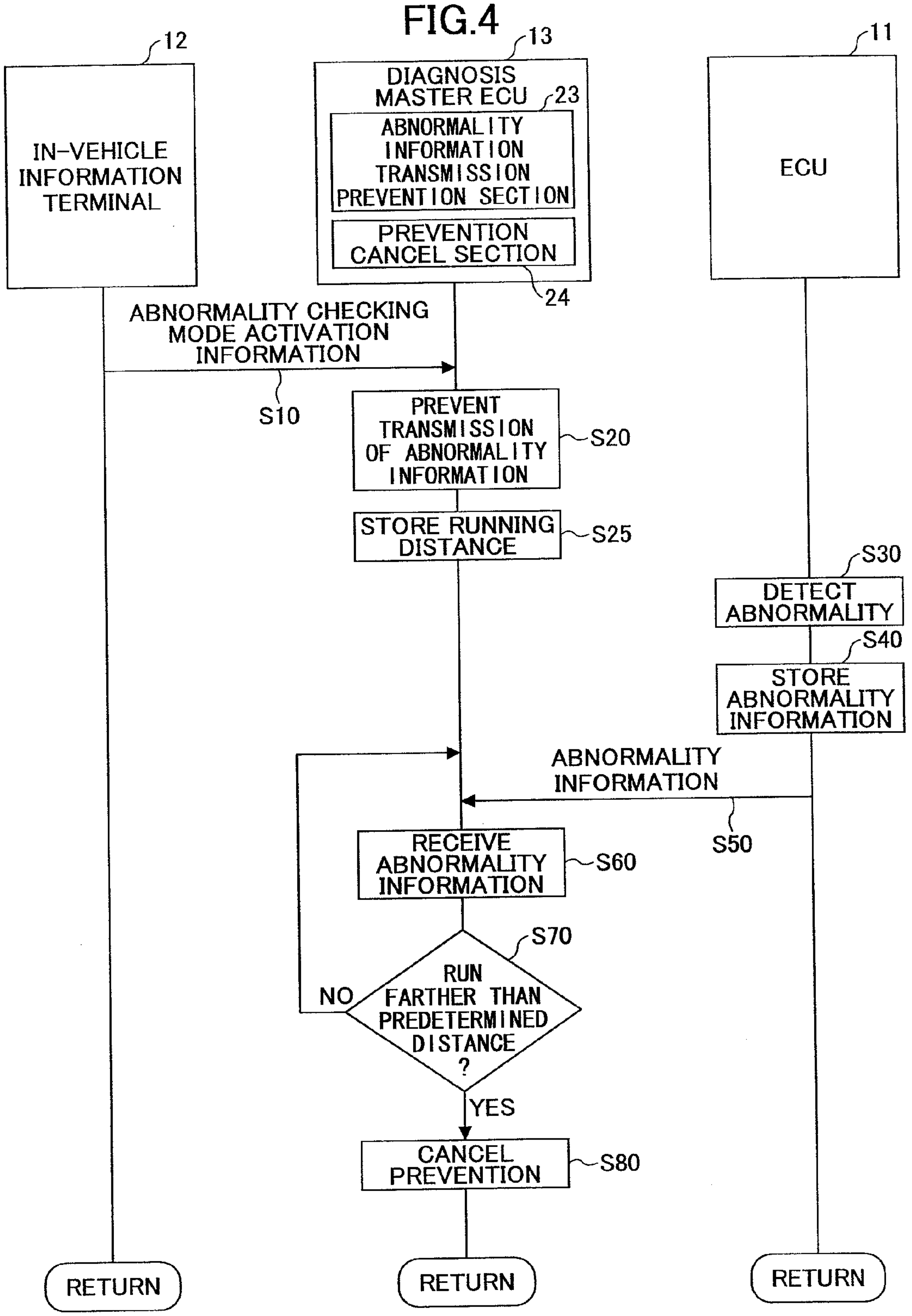
FIG. 4 is an example of a sequence diagram showing a procedure of preventing transmission of abnormality information (a first embodiment)

FIG. 4 is an example of a sequence diagram showing a process of preventing the transmission of abnormality information. After the vehicle 50 is brought into the service facility 40, the abnormality checking mode is activated via the in-vehicle information terminal 12 by operating the in-vehicle information terminal 12 by a service person. In this case, the in-vehicle information terminal 12 transmits the abnormality checking mode activation information to the diagnosis master ECU 13 (step S10).

When the diagnosis master ECU 13 receives the abnormality checking mode activation information, the abnormality information transmission prevention section 23 prevents the transmission of the abnormality information (step S20). Further, the prevention cancel section 24 stores the prevention-time running distance when the transmission of the abnormality information is prevented (step S25).

After step S20, due to repair and service work by a service person, the ECU 11 may detect abnormality (step S30) and store the detected abnormality (step S40). In a case where no abnormality checking mode activation information has been transmitted to the ECU 11, the ECU 11 that detects the abnormality sends a request to a meter ECU or the like to turn ON a corresponding warning lamp. The abnormal information stored in the ECU 11 is deleted by a diagnosis tool or the like before the vehicle 50 is delivered to its user.

The ECU 11 storing the abnormality information transmits the abnormality information to the diagnosis master ECU 13 (step S50), and the diagnosis master ECU 13 receives the abnormality information (step S60). However, in this case, the abnormality information is not further transmitted from the diagnosis master ECU 13. In other words, for example, the diagnosis master ECU 13 may discard (delete) the received abnormality information (as a result, the abnormality information is not stored in the diagnosis master ECU 13).

After the abnormality information transmission prevention section 23 prevents the transmission of the abnormality information, the prevention cancel section 24 determines whether the vehicle 50 runs farther than the predetermined distance from the prevention-time running distance in every predetermined cycle (step S70). If it is determined that the vehicle 50 runs farther than the predetermined distance (YES in step S70), the prevention cancel section 24 cancels the prevention of the transmission of the abnormality information (step S80). Further, the prevention cancel section 24 may cancel the prevention of the transmission of the abnormality information when the position of the vehicle 50 is separated from the service facility 40 by a predetermined distance or more. In this case, for example, a position information of an original point when the transmission of abnormality information is prevented (i.e., the position of the service facility 40) is stored. Then, when the position of the vehicle 50 is separated from the service facility 40 (the original point) by, for example, 10 km, the prevention of the transmission of the abnormality information is cancelled.

As described above, the abnormality detection device 100 according to this embodiment of the present invention is configured to detect a predetermined operation that is most likely to be performed on the in-vehicle information terminal 12 when the vehicle 50 is in for service in a service facility 40 or the like and prevent the transmission of the abnormality information. Because of this feature, it may become possible to automatically set to prevent the transmission of the abnormality information without any additional alarm prevention operation conducted by the service person. Namely, both checking of the abnormality and the alarm prevention operation may be automatically performed at the same time, thereby enabling surely preventing the transmission of the abnormality information.

Modified Embodiment

Figure 5:
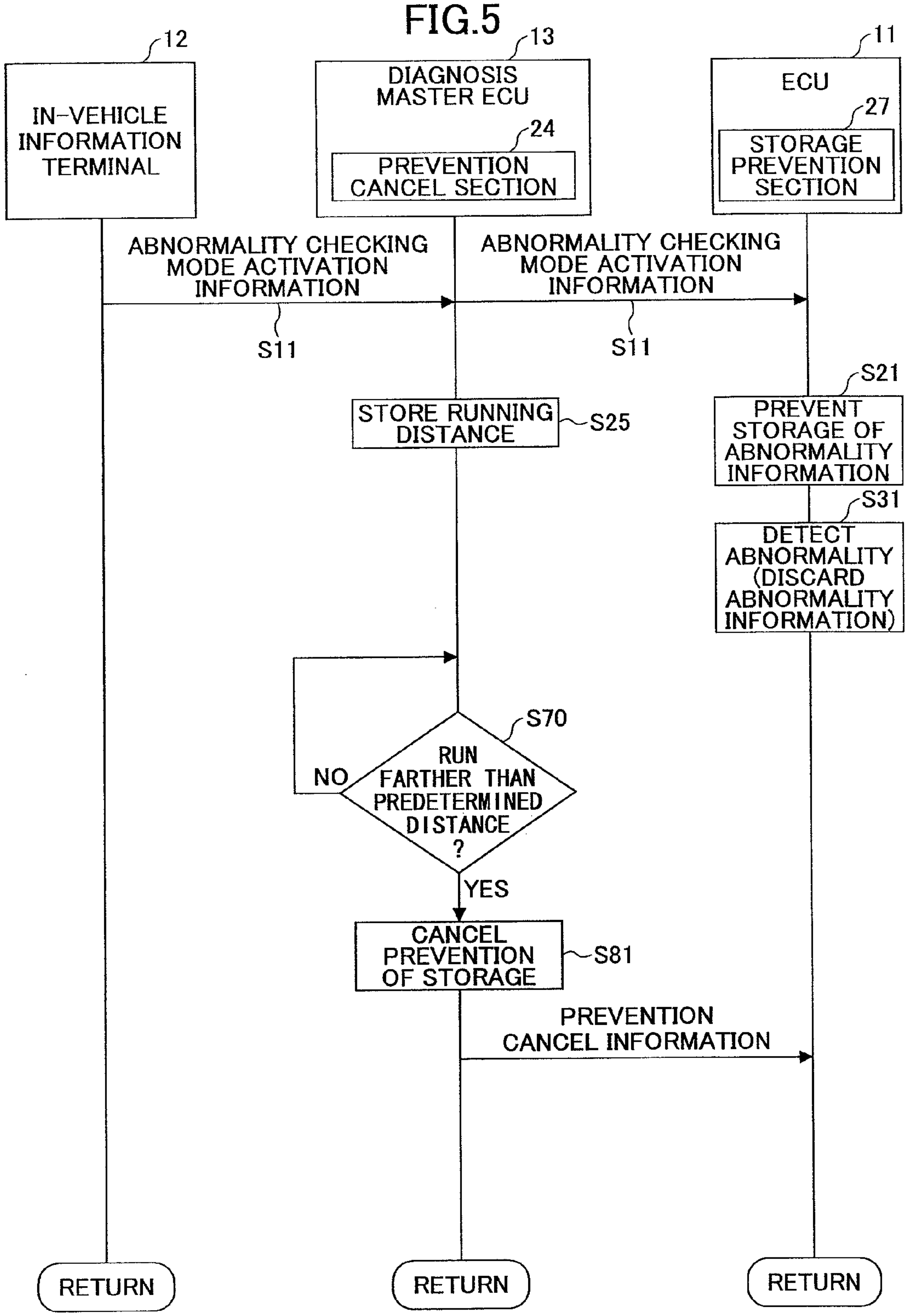
FIG. 5 is an example of a sequence diagram showing a procedure of preventing transmission of abnormality information (a modified first embodiment)

In the above first embodiment, it is the diagnosis master ECU 13 that prevents the transmission of abnormality information. However, the transmission of the abnormality information generated due to service work may also be prevented by another configuration in which the ECU 11 does not store the abnormality information. FIG. 5 is an example of a sequence diagram showing a process of preventing the transmission of the abnormality information according to this modified embodiment. As shown in FIG. 5, the diagnosis master ECU 13 does not include the abnormality information transmission prevention section 23. However, the ECU 11 includes a storage prevention section 27. After receiving the abnormality checking mode activation information, the storage prevention section 27 prevents the storage of the abnormality information. Therefore, in the modified embodiment of FIG. 5, the abnormality information is not transmitted to the diagnosis master ECU 13, and as a result, the diagnosis master ECU 13 does not transmit the abnormality information.

The abnormality checking mode is set via the in-vehicle information terminal 12 by operating the in-vehicle information terminal 12 by a service person. Then, for example, the in-vehicle information terminal 12 broadcastingly transmits the abnormality checking mode activation information to the diagnosis master ECU 13 and the ECU 11 (step S11). Since this transmission is based on the time division multiplexed communication scheme, both the diagnosis master ECU 13 and the ECU 11 may receive the abnormality checking mode activation information in a single transmission.

When the diagnosis master ECU 13 receives the abnormality checking mode activation information, the prevention cancel section 24 stores the prevention-time running distance when the transmission of the abnormality information is prevented (step S25). Further, when the ECU 11 receives the abnormality checking mode activation information, the storage prevention section 27 prevents the storage of the abnormality information even when abnormality is detected (step S21). Therefore, even if the ECU 11 detects abnormality due to repair and service work performed by a service person, the ECU 11 does not store the abnormality information (step S31), and the abnormality information is not transmitted to the diagnosis master ECU 13. As a result, the diagnosis master ECU 13 does not transmit the abnormality information to the analysis center 60. Further, when the abnormality information is not stored, the abnormality is thought to be generated by service work. Therefore, the ECU 11 does not send a request to the meter ECU or the like to turn ON the corresponding warning lamp.

After the abnormality information transmission prevention section 23 prevents the transmission of the abnormality information, the prevention cancel section 24 determines whether the vehicle 50 runs farther than the predetermined distance from the prevention-time running distance in every predetermined cycle (step S70). When it is determined that the vehicle 50 runs farther than the predetermined distance (YES in step S70), the prevention cancel section 24 transmits prevention cancel information to the ECU 11 to cancel the prevention of the storage of the abnormality information (step S81). After this step, the ECU 11 can store the abnormality information.

In the configuration of FIG. 5, the storage of the abnormality information is prevented. However, alternatively, the detection of the abnormality information may be prevented. In this case, for example, the ECU 11 stops its diagnosis function. By doing this, since no abnormality information is to be generated, it may become possible to prevent the transmission of the abnormality information to the analysis center 60 similar to the case of FIG. 5.

Further, in the configuration of FIG. 5, the diagnosis master ECU 13 cancels the prevention of the storage of the abnormality information performed by the ECU 11. However, alternatively, the ECU 11 may cancel the prevention of the storage of the abnormality information. To that end, the ECU 11 includes the prevention cancel section 24. The prevention-time running distance is stored. When the vehicle 50 runs farther than the predetermined distance from the prevention-time running distance, the prevention of the storage of the abnormality information is cancelled.

Embodiment 2

In the above first embodiment, by activating the abnormality checking mode in the in-vehicle information terminal 12, it becomes possible to prevent the transmission of the abnormality information from the diagnosis master ECU 13 while the vehicle 50 is in for service in the service facility 40. In this embodiment of the present invention, an abnormality detection device 100 configured to prevent the transmission of the abnormality information when a diagnosis tool 20 is in communication with the ECU 11 is described.

Figure 6:
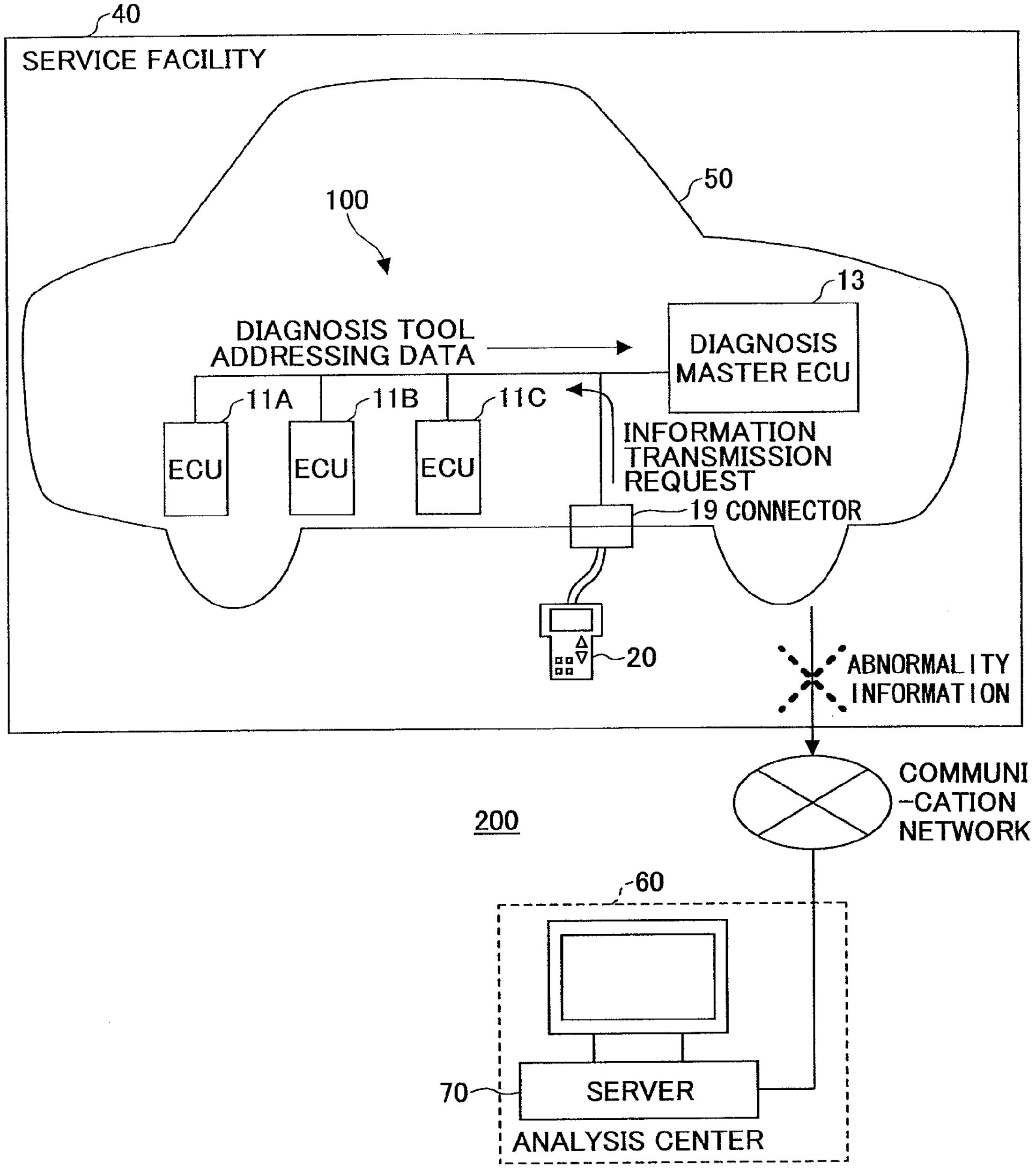
FIG. 6 is a drawing schematically showing an exemplary configuration of an abnormality information transmission system.

FIG. 6 schematically shows a configuration of the abnormality detection device 100 according to this embodiment of the present invention. In FIG. 6, the same reference numerals are commonly used in the same elements in FIG. 2 and the description thereof is omitted. As shown in FIG. 6, the abnormality detection device 100 according to this embodiment of the present invention further includes a connector 19 and is in connection with the diagnosis tool 20 through the connector 19. Similar to the ECU 11, the connector 19 is in connection with an in-vehicle LAN such as CAN so that the connector 19 serves as an interface when an external terminal such as the diagnosis tool 20 is in communication with the ECU 11 using CAN protocol or the like.

The diagnosis tool 20 includes a communication port, a control section, a storage section, an operating section, and a display section. A diagnosis program is stored in the storage section and executed by the control section to diagnose the ECU 11. When the diagnosis tool 20 sends an information transmission request to the abnormality detection device 100, a predetermined ECU (for example, the engine ECU) transmits communication data including information items such as a vehicle model and an engine type to the CAN. A data ID of the communication data is a specific data ID that is to be transmitted when the diagnosis tool 20 is in connection. Therefore, when the diagnosis master ECU 13 receives the data ID of the communication data, the diagnosis master ECU 13 detects that the diagnosis tool 20 is in connection. In the following, communication data transmitted by the engine ECU is referred to as diagnosis tool addressing data.

While the diagnosis tool 20 is in connection, it is expected that the abnormality information is detected, the abnormality information being generated due to a simulated signal simulating abnormality and service work and accordingly not based on an actual malfunction. Such abnormality information should not be transmitted to the analysis center 60. To that end, when receiving the diagnosis tool addressing data, the diagnosis master ECU 13 prevents the transmission of the abnormality information in the same manner as in the first embodiment of the present invention.

The diagnosis tool 20 receives the communication data transmitted from the ECU 11, extracts the vehicle information and the abnormality information from the communication data of the ECU 11, and when necessary, performs a calculation to compare with a previously stored reference value. Based on the comparison result, the presence of the abnormality is displayed on the display section. The diagnosis tool 20 may be configured as an independent portable device so that a service person connects the diagnosis tool 20 only when the vehicle 50 is diagnosed, or integrated in the vehicle 50 to be activated only during diagnosis.

Therefore, the abnormality detection device 100 according to this embodiment of the present invention may prevent the transmission of the abnormality information without an alarm prevention operation conducted by the service person by preventing the transmission of the abnormality information when the abnormality detection device 100 is in connection with the diagnosis tool 20 which is more likely to be connected during service work.

Figure 7:
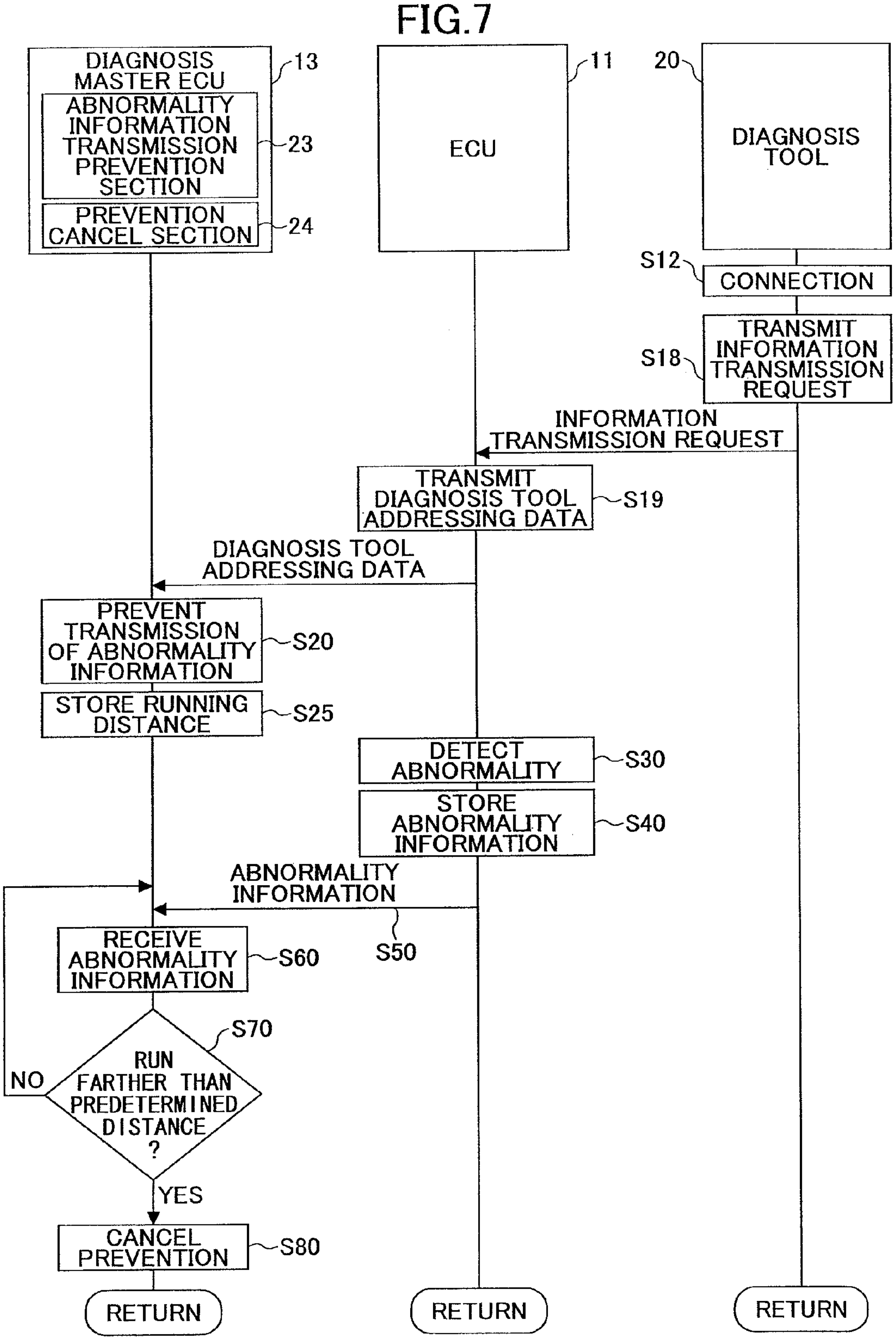
FIG. 7 is an example of a sequence diagram showing an operational procedure of the abnormality detection device (a second embodiment)

A sequential process of the abnormality detection device 100 according to this embodiment of the present invention is described with reference to a sequence diagram of FIG. 7. The functional block of the diagnosis master ECU 13 is the same as that described in the first embodiment with reference to FIG. 3. Namely, according to this embodiment of the present invention, the abnormality information transmission prevention section 23 prevents the transmission of the abnormality information upon receiving the diagnosis tool addressing data instead of the abnormality checking mode activation information.

The vehicle 50 is brought into the service facility 40, and a service person connects the diagnosis tool 20 to the abnormality detection device 100 (step S12). Then, the diagnosis tool 20 sends the information transmission request to the abnormality detection device 100 automatically or by an operation performed by the service person (step S18). In this case, the information transmission request may be transmitted to a predetermined ECU 11 such as the engine ECU or broadcastingly transmitted (multicast transmission).

Next, the predetermined ECU 11 receives the information transmission request, and transmits the diagnosis tool addressing data to the in-vehicle LAN to arrive at the diagnosis master ECU 13 as the destination (step S19). In response to the information transmission request, the ECU 11 transmits the abnormality information stored in the ECU 11 to the diagnosis tool 20.

Further, when the diagnosis master ECU 13 receives the diagnosis tool addressing data, the abnormality information transmission prevention section 23 prevents the transmission of the abnormality information (step S20). Further, the prevention cancel section 24 stores the prevention-time running distance when the transmission of the abnormality information is prevented (step S25). All the subsequent steps are the same as those in the first embodiment of FIG. 4.

Next, due to repair and service work performed by a service person, the ECU 11 detects abnormality (step S30) and stores the abnormality information (step S40). The ECU 11 having detected the abnormality sends a request to a meter ECU or the like to turn ON the corresponding warning lamp. The ECU 11 having stored the abnormality information transmits the abnormality information to the diagnosis master ECU 13 (step S50), and the diagnosis master ECU 13 receives the abnormality information (step S60). However, the abnormality information is not further transmitted. The diagnosis master ECU 13 discards (deletes) the received abnormality information (i.e., the abnormality information is not stored in the diagnosis master ECU 13)

After the abnormality information transmission prevention section 23 prevents the transmission of the abnormality information, the prevention cancel section 24 determines whether the vehicle 50 runs farther than a predetermined distance from the prevention-time running distance in every predetermined cycle (step S70). When it is determined that the vehicle 50 runs farther than the predetermined distance (YES in step S70), the prevention cancel section 24 cancels the prevention of the transmission of the abnormality information (step S80). Further, the prevention cancel section 24 may cancel the prevention of the transmission of the abnormality information when the position of the vehicle 50 is separated from the service facility 40 by a predetermined distance or more. In this case, for example, the position information when the transmission of abnormality information is prevented (i.e., the position of the service facility 40) is stored, and when the position of the vehicle 50 is separated from the service facility 40 by, for example, 10 km, the prevention of the transmission of the abnormality information is cancelled.

As described above, the abnormality detection device 100 according to this embodiment of the present invention is configured to detect the connection of the diagnosis tool 20 which is most likely to be connected when the vehicle 50 is in for service in a service facility 40 or the like and prevent the transmission of the abnormality information based on the detection. Because of this feature, it may become possible to automatically set to prevent the transmission of the abnormality information without an additional alarm prevention operation conducted by the service person. Namely, the checking of the abnormality and the alarm prevention operation may be automatically performed at the same time, which enables to surely prevent the transmission of the abnormality information.

Similar to the above modified first embodiment of the present invention, the ECU 11 may be configured not to store abnormality information when the diagnosis tool 20 is connected. Further, the ECU 11 may be configured not to detect abnormality. Further, the diagnosis master ECU 13 does not cancel the prevention of storage of the abnormality information, and the ECU 11 may be configured to cancel the prevention of the storage of the abnormality information.

Embodiment 3

In first and second embodiments of the present invention, the transmission of the abnormality information to the analysis center 60 is prevented. By doing this, the abnormality information generated due to not malfunction but service work is not transmitted to the analysis center 60. However, even when the abnormality information generated due to the service work is transmitted to the analysis center 60, if the analysis center 60 is capable of determining that the transmitted abnormality information is generated due to service work, it may not be a problem even if the abnormality information generated due to the service work is transmitted to the analysis center 60. From this point of view, in the following description of a third embodiment of the present invention, an abnormality information transmission system 200 is described in which the analysis center 60 is capable of determining whether the transmitted abnormality information is generated due to malfunction or service work.

In the following, the abnormality information generated due to service work is referred to as abnormality information (service), and the abnormality information generated due to malfunction is referred to as abnormality information (malfunction). Unless otherwise distinguished, the term abnormality information is simply used.

Figure 8:
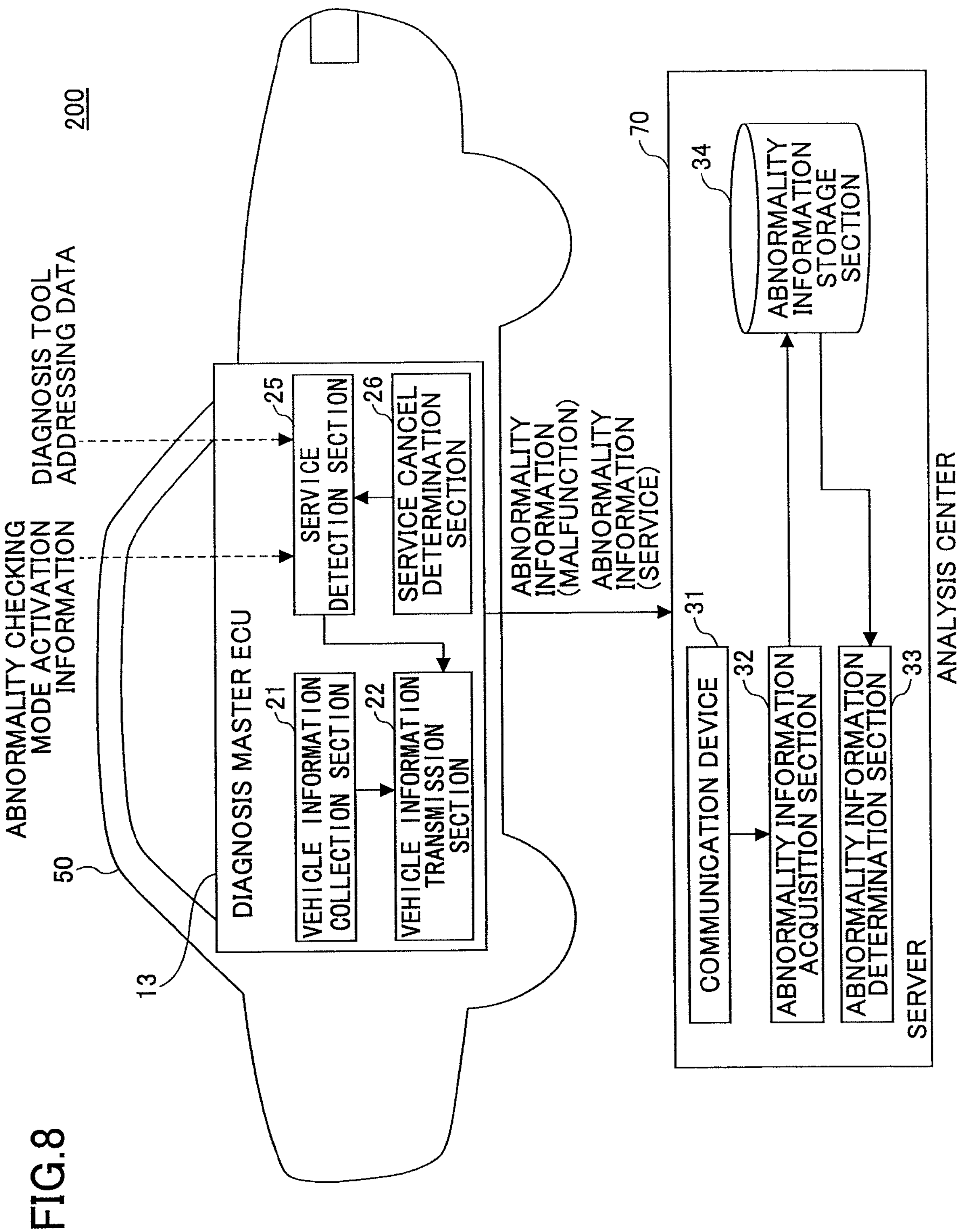
FIG. 8 is an example of a functional block diagram showing a diagnosis master ECU and a server of an analysis center.

FIG. 8 shows functional block diagrams of the diagnosis master ECU 13 in the vehicle 50 and the server 70 in the analysis center 60. The configuration of the abnormality detection device 100 according to this embodiment of the present invention may be the same as that of first or second embodiment of the present invention. In FIG. 8, only diagnosis master ECU 13 of the abnormality detection device 100 is depicted. As shown in FIG. 8, the diagnosis master ECU 13 according to this embodiment of the present invention further includes a service detection section 25 and a service cancel determination section 26. When receiving the abnormality checking mode activation information or the diagnosis tool addressing data, the service detection section 25 detects that the vehicle 50 is in for service and sends a request to the vehicle information transmission section 22 to set a flag indicating that the abnormality information to be transmitted from the vehicle information transmission section 22 is generated due to service work. For example, a flag "0" is set for the abnormality information generated due to not service work but malfunction, and a flag "1" is set for the abnormality information generated due to service work. Therefore, the abnormality information having the flag "0" is determined as abnormality information (malfunction), and the abnormality information having the flag "1" is determined as abnormality information (service).

Further, similar to first and second embodiments, the service cancel determination section 26 stores a prevention-time running distance which is a running distance when the abnormality checking mode activation information or the diagnosis tool addressing data is received. Further, the service cancel determination section 26 determines that service work is completed when the vehicle 50 runs farther than a predetermined distance from the prevention-time running distance (reference running distance) and reports the determined result to the vehicle information transmission section 22. Therefore, after it is determined that the service work is completed, the flag of the abnormality information is set to "0".

Next, the server 70 of the analysis center 60 is described. The server 70 includes a display control section controlling a CPU, a RAM, a ROM, a display, a GUI, and the like, a nonvolatile memory storing programs and files, and a CPU executing various programs and comprehensively controlling the server 70. The server 70 includes an abnormality information acquisition section 32 and an abnormality information determination section 33 that are implemented by executing a program by the CPU or hardware such as an ASIC (Application Specific Integrated Circuit). The server 70 further includes an abnormality information storage section 34 which is provided by the nonvolatile memory.

The server 70 is connected to a network such as the Internet and further includes a communication device 31 connected to the network to receive the abnormality information by executing a protocol process such as TCP/IP. The communication device 31 may be a NIC (Network Interface Card) and receives the abnormality information by performing a protocol process with respect to data that have been divided into packet data and transmitted.

For example, the following items of the abnormality information are transmitted from the abnormality detection device 100.

Abnormality Information (Malfunction)
diagnosis code; FFD; information indicating whether warning lamp is turned ON; flag "0"

Abnormality Information (Service)
diagnosis code; FFD; information indicating whether warning lamp is turned ON; flag "1"

The abnormality information acquisition section 32 associates the received abnormality information (malfunction) and the received abnormality information (service) with identification information of the vehicle 50, received time, and the like, and the associated data are stored in the abnormality information storage section 34. The identification information of the vehicle 50 may be determined based on, for example, sender's information (such as telephone number assigned to the vehicle 50) stored in the packet data of the abnormality information in accordance with the relevant protocol. The sender's information is previously assigned in accordance with the vehicle type and the engine model. Therefore, the analysis center 60 may identify the vehicle 50 based on the received sender's information to the extent necessary for the analysis of abnormality information. Further, not the time information when the abnormality is received but the time information when the abnormality is detected may be included in the abnormality information and transmitted.

The abnormality information determination section 33 refers to the flag in the abnormality information stored in the abnormality information storage section 34 and determines whether the abnormality information is abnormality information (malfunction) or abnormality information (service) with respect to each abnormality information. In this case, the abnormality information determined as the abnormality information (service) is, for example, deleted. Therefore, the analysis center 60 may analyze the cause of the abnormality and the like only based on the abnormality information (malfunction).

Further, it may not be necessary to include the flag in the abnormality information. In such case, when the malfunctioning vehicle 50 is repaired in the service facility 40, repair information (such as identification information of the vehicle 50, service facility 40 where the repair is done, a diagnosis code when abnormality is detected, and name of exchanged parts) is transmitted to the analysis center 60. Therefore, abnormality information can be determined as the abnormality information (service) when the abnormality information transmitted from the vehicle 50 includes the same identification information as that included in the repair information transmitted from the service facility 40 to the analysis center 60. In this case, for example, when the abnormality information is transmitted in a time range between a certain period of time (for example, one week) before the information related to the repair is transmitted and a time period of time (for example, one week) after the information related to the repair is transmitted, the abnormality information is regarded as the abnormality information (service) and is not used for the analysis of the abnormality. By doing this, it is not necessary to include the flag in the abnormality information, and as a result, cost increase of the diagnosis master ECU 13 may be better controlled.

Figure 9:
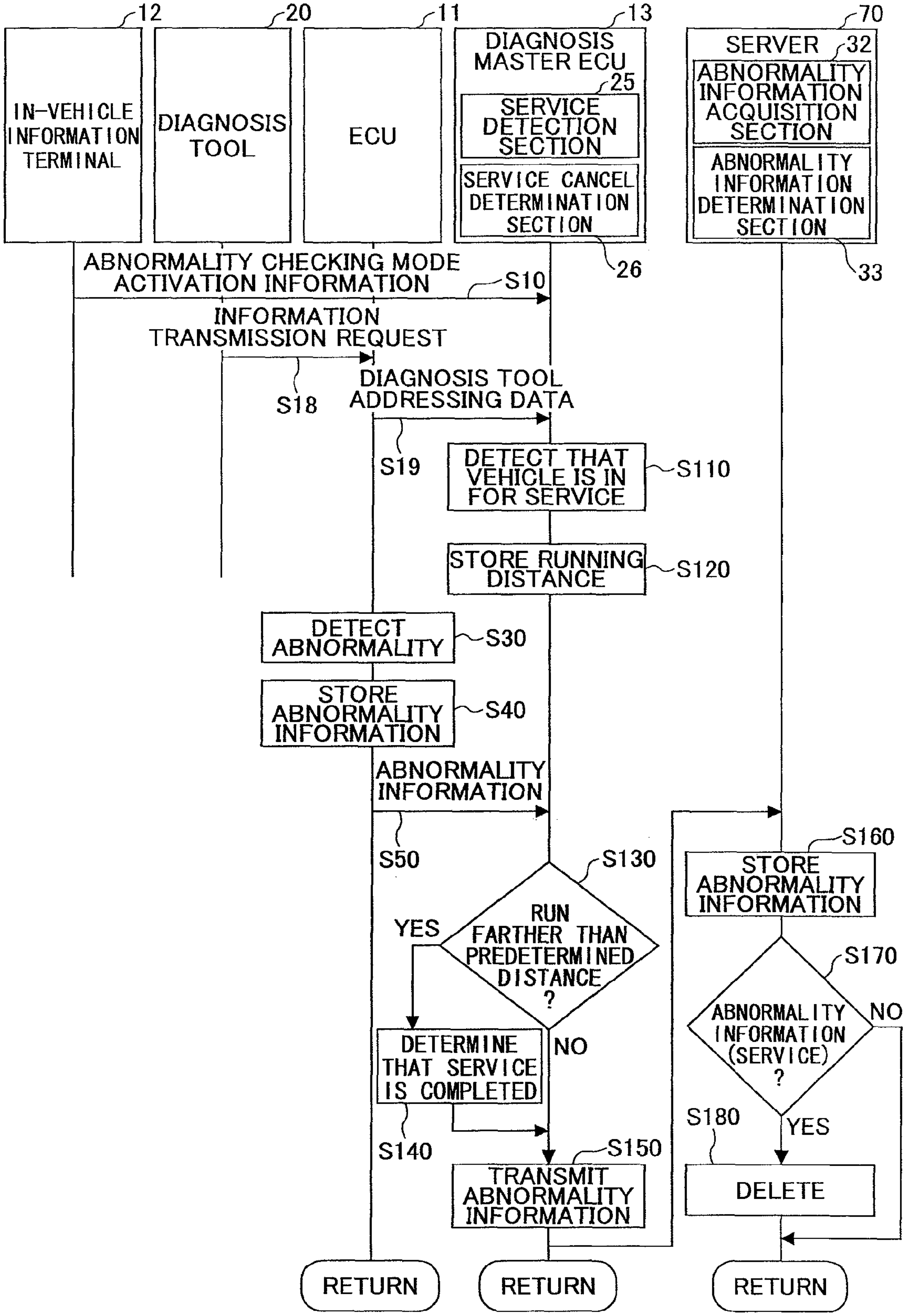
FIG. 9 is an example of a sequence diagram showing a transmission procedure of abnormality information in an abnormality information transmission system (a third embodiment).

FIG. 9 is an example of a sequence diagram showing a transmission process of the abnormality information in the abnormality information transmission system 200 according to this embodiment of the present invention. After the vehicle 50 is brought into the service facility 40, the abnormality checking mode is activated via the in-vehicle information terminal 12 by operating the in-vehicle information terminal 12 by a service person. In this case, the in-vehicle information terminal 12 transmits abnormality checking mode activation information to the diagnosis master ECU (step S10). Further, when the service person connects the diagnosis tool 20 to the abnormality detection device 100, the diagnosis tool 20 sends the information transmission request to the ECU 11 automatically or by the operation of the service person (step S18). Then, the ECU 11 transmits the diagnosis tool addressing data to the diagnosis master ECU 13 (step S19).

The service detection section 25 of the diagnosis master ECU 13 detects that the vehicle 50 is in for service by receiving the abnormality checking mode activation information or the diagnosis tool addressing data (step S110). Then, the service cancel determination section 26 stores the prevention-time running distance when the abnormality checking mode activation information or the diagnosis tool addressing data is received (step S120).

Referring back to the process of the diagnosis master ECU 13, due to repair and service work performed by a service person, the ECU 11 detects abnormality (step S30), and stores the abnormality information (step S40). The ECU 11 having detected the abnormality sends a request to a meter ECU or the like to turn ON the corresponding warning lamp. The ECU 11 having stored the abnormality information transmits the abnormality information to the diagnosis master ECU 13 (step S50)

The service cancel determination section 26 of the diagnosis master ECU 13 determines whether the vehicle 50 runs farther than a predetermined distance from when the vehicle 50 is in for service (step S130). When it is determined that the vehicle 50 does not run farther than the predetermined distance (NO in step S130), the vehicle information transmission section 22 transmits the abnormality information while detecting that vehicle 50 is in for service (step S150). Namely, while the determination result in step S130 is NO, the abnormality information to be transmitted is regarded as the abnormality information (service).

On the other hand, when it is determined that the vehicle 50 runs farther than the predetermined distance (YES in step S130), the service cancel determination section 26 determines that the service work has completed (step S140). Then, the vehicle information transmission section 22 transmits the abnormality information (step S150). However, in this case where the determination result in step S130 is YES, the abnormality information to be transmitted is regarded as the abnormality information (malfunction).

Next, the process performed in the server 70 is described. When the communication device 31 receives the abnormality information, the abnormality information acquisition section 32 stores the abnormality information in the abnormality information storage section 34 (step S160). Then the abnormality information determination section 33 determines whether the abnormality information is abnormality information (service) (step S170). When it is determined that the abnormality information is abnormality information (service) (YES in step S170), the abnormality information determination section 33 deletes the abnormality information (service) (step S180).

In the abnormality information transmission system 200 according to this embodiment of the present invention, the analysis center 60 may determine whether the abnormality information is the abnormality information (malfunction) or the abnormality information (service), thereby enabling ensuring the analysis of the abnormality.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teachings herein set forth.

The present application is based on and claims the benefit of priority of Japanese Patent Application No. 2008-077293, filed on Mar. 25, 2008, the entire contents of which are hereby incorporated herein by reference.

The invention claimed is:

1. An abnormality detection device comprising:

a storage unit configured to, when abnormality of an in-vehicle device is detected, store abnormality information of the abnormality;

a transmission unit configured to transmit the abnormality information to a server;

an in-vehicle information terminal configured to provide driving support information to an occupant, detect whether an operation input through a user interface of the in-vehicle information terminal is a predetermined operation inputting read-out operation information and, when detecting the predetermined operation, read out the abnormality information stored in the storage unit;

a transmission prevention unit configured to, when the read-out operation information is input through the user interface, prevent transmission of the abnormality information to the server; and a prevention cancel unit configured to cancel the prevention of the transmission of the abnormality information when a vehicle comprising the abnormality detection device has run a predetermined running distance from a running distance when the transmission of the abnormality information is prevented by the transmission prevention unit.

2. The abnormality detection device according to claim 1, further comprising:

a storage prevention unit configured to, when the read-out operation information is input through the user interface, prevent storage of the abnormality information, wherein the transmission of the abnormality information is prevented by the transmission prevention unit.

3. The abnormality detection device according to claim 1, wherein when the read-out operation information is input through the user interface, a detection of abnormality of an in-vehicle device is prevented without preventing the transmission of the abnormality information by the transmission prevention unit.

4. The abnormality detection device according to claim 1, wherein the user interface is in the in-vehicle information terminal or a user interface of a navigation device.

5. The abnormality detection device according to claim 1, further comprising:

a display unit configured to display the abnormality information read out from the storage unit.

6. The abnormality detection device according to claim 1, wherein the abnormality information includes at least one of a diagnosis code indicating a content of the abnormality using a symbol, a number, or combination of a symbol and a number, detection information detected from the in-vehicle device when the abnormality is detected, and information whether an alarm lamp is turned ON.

7. A method of detecting abnormality comprising:

storing, when abnormality of an in-vehicle device is detected, abnormality information of the abnormality in a storage unit;

transmitting the abnormality information to a server by a transmission unit;

detecting whether an operation input through a user interface of an in-vehicle information terminal is a predetermined operation inputting read-out operation information;

reading, when the read-out operation information is input through the user interface, the abnormality information stored in the storage unit; and prohibiting, when the read-out operation information is input through the user interface, transmission of the abnormality information to the server by a transmission prevention unit; and cancelling the prevention of the transmission of the abnormality information when a vehicle comprising the abnormality detection device has run a predetermined running distance from a running distance when the transmission of the abnormality information is prevented by the transmission prevention unit.

8. An abnormality information transmission system comprising:

an abnormality detection device configured to detect abnormality of an in-vehicle device and transmit abnormality information of the abnormality; and a server configured to receive the abnormality information of the abnormality detection device, wherein:

the abnormality detection device comprises:

a storage unit configured to, when abnormality of an in-vehicle device is detected, store abnormality information of the abnormality;

a transmission unit configured to transmit the abnormality information to a server;

an in-vehicle information terminal configured to provide driving support information to an occupant, detect whether an operation input through a user interface of the in-vehicle information terminal is a predetermined operation inputting read-out operation information and, when detecting the predetermined operation, read out the abnormality information stored in the storage unit; and a transmission prevention unit configured to, when the read-out operation information is input through the user interface, prevent transmission of the abnormality information to the server; and a prevention cancel unit configured to cancel the prevention of the transmission of the abnormality information when a vehicle comprising the abnormality detection device has run a predetermined running distance from a running distance when the transmission of the abnormality information is prevented by the transmission prevention unit.

* * * * *